United States Patent
Lee

(10) Patent No.: US 6,963,576 B1
(45) Date of Patent: Nov. 8, 2005

(54) SCHEDULING AND ARBITRATION SCHEME FOR NETWORK PROCESSING DEVICE

(75) Inventor: Eugene W. Lee, San Jose, CA (US)

(73) Assignee: Force10 Networks, Inc., Milpitas, CA (US)

( * ) Notice: Subject to any disclaimer, the term of this patent is extended or adjusted under 35 U.S.C. 154(b) by 602 days.

(21) Appl. No.: 09/676,046

(22) Filed: Sep. 28, 2000

(51) Int. Cl.$^7$ .......................... H04L 12/28; H04L 12/56
(52) U.S. Cl. ...................... 370/411; 370/414; 370/395.4
(58) Field of Search ........................ 370/411, 412, 401, 370/395.1, 395.4, 395.42, 390, 432, 447, 370/448, 442, 458, 389, 392

(56) References Cited

U.S. PATENT DOCUMENTS

| | | | |
|---|---|---|---|
| 6,188,690 B1 * | 2/2001 | Holden et al. | 370/390 |
| 6,295,295 B1 * | 9/2001 | Wicklund | 370/392 |
| 6,445,706 B1 * | 9/2002 | Fransson et al. | 370/395.42 |
| 6,556,571 B1 * | 4/2003 | Shahrier et al. | 370/395.4 |
| 6,563,837 B2 * | 5/2003 | Krishna et al. | 370/413 |
| 6,654,371 B1 * | 11/2003 | Dunstan et al. | 370/390 |
| 6,667,984 B1 * | 12/2003 | Chao et al. | 370/414 |

* cited by examiner

Primary Examiner—Brian Nguyen
(74) Attorney, Agent, or Firm—Haynes and Boone, LLP

(57) ABSTRACT

An arbitration scheme is used for scheduling connections between input ports and output ports. Input ports request connections to the output ports for a next time slot. Arbitration parameters, such as priority and weight, are identified for the buffer requests. Output port arbitrations are conducted for each one of the output ports according to the arbitration parameters. If there are more than two input buffers with the same priority and weight, a round robin arbitration is used. Grants are issued to the input port buffers winning the output port arbitrations. Input port arbitrations are conducted using the same arbitration parameters for input ports receiving multiple grants. The grants are accepted by the input port buffers winning the input port arbitrations. The input port buffers accepting the grants are connected to the requested output ports. Virtual output buffers are used to prevent packet blocking at the input ports and a dual multicast and unicast arbitration is used for multicast and unicast packets.

29 Claims, 8 Drawing Sheets

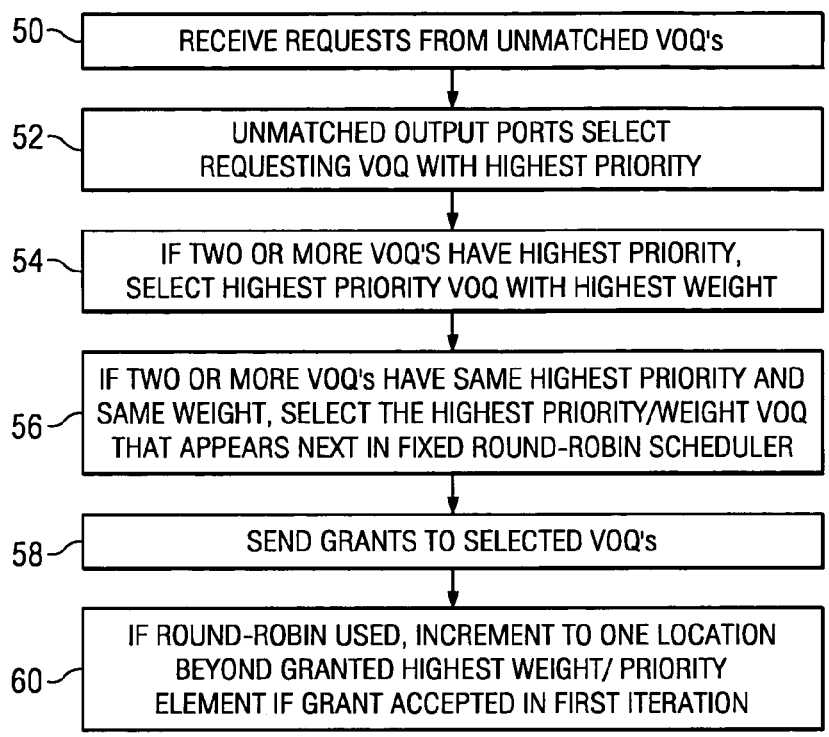
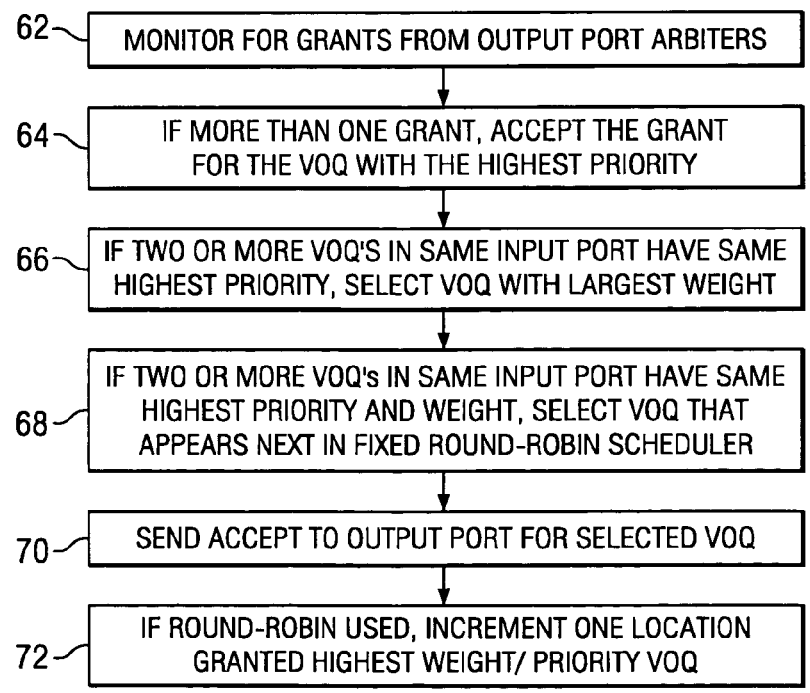

US 6,963,576 B1

SCHEDULING AND ARBITRATION SCHEME FOR NETWORK PROCESSING DEVICE

BACKGROUND OF THE INVENTION

A network processing device, such as a router or switch, receives packets at multiple input ports. The network processing device receives these incoming packets at the input ports and routes the packets to appropriate destinations through corresponding output ports. Headers in the packets identify which output ports should be used for transmitting the packets. The incoming packets from the input ports are temporarily stored in buffers until the appropriate output ports are ready to forward the packets toward the appropriate destination addresses. It is desirable to route these packets as quickly and efficiently as possible to the corresponding output ports.

Problems arise when multiple input ports request access to the same output ports at the same time. If one input port continuously has high priority or high weight packets (large number of bytes), lower priority or lower weight packets (small number of bytes) have to wait long periods of time before gaining access to the targeted output port. Different arbitration schemes are used to determine what order the packets at input ports are granted access the different output ports. Present arbitration schemes do not fairly and efficiently arbitrate among the requesting input ports.

The present invention addresses this and other problems associated with the prior art.

SUMMARY OF THE INVENTION

An arbitration scheme is used for scheduling connections between input ports and output ports. Input ports request connections to the output ports for a next time slot. Arbitration parameters, such as priority and weight, are identified for the buffer requests. Output port arbitrations are conducted for each one of the output ports according to the arbitration parameters. If there are two or more input buffers with the same priority and weight, a round robin arbitration is used. Grants are issued to the input port buffers selected during the output port arbitrations.

Input port arbitrations are then conducted for input ports receiving multiple grants. The output port grants are accepted by the input port buffers selected during the input port arbitrations. The input port buffers accepting the grants are connected to the requested output ports.

Virtual output buffers are used to prevent packet blocking at the input ports and a dual multicast and unicast arbitration is used for multicast and unicast packets.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 3 is a flow diagram showing how output port arbitration is conducted in the scheduler.

FIG. 4 is a flow diagram showing how input port arbitration is conducted in the scheduler.

DETAILED DESCRIPTION

Figure 1:
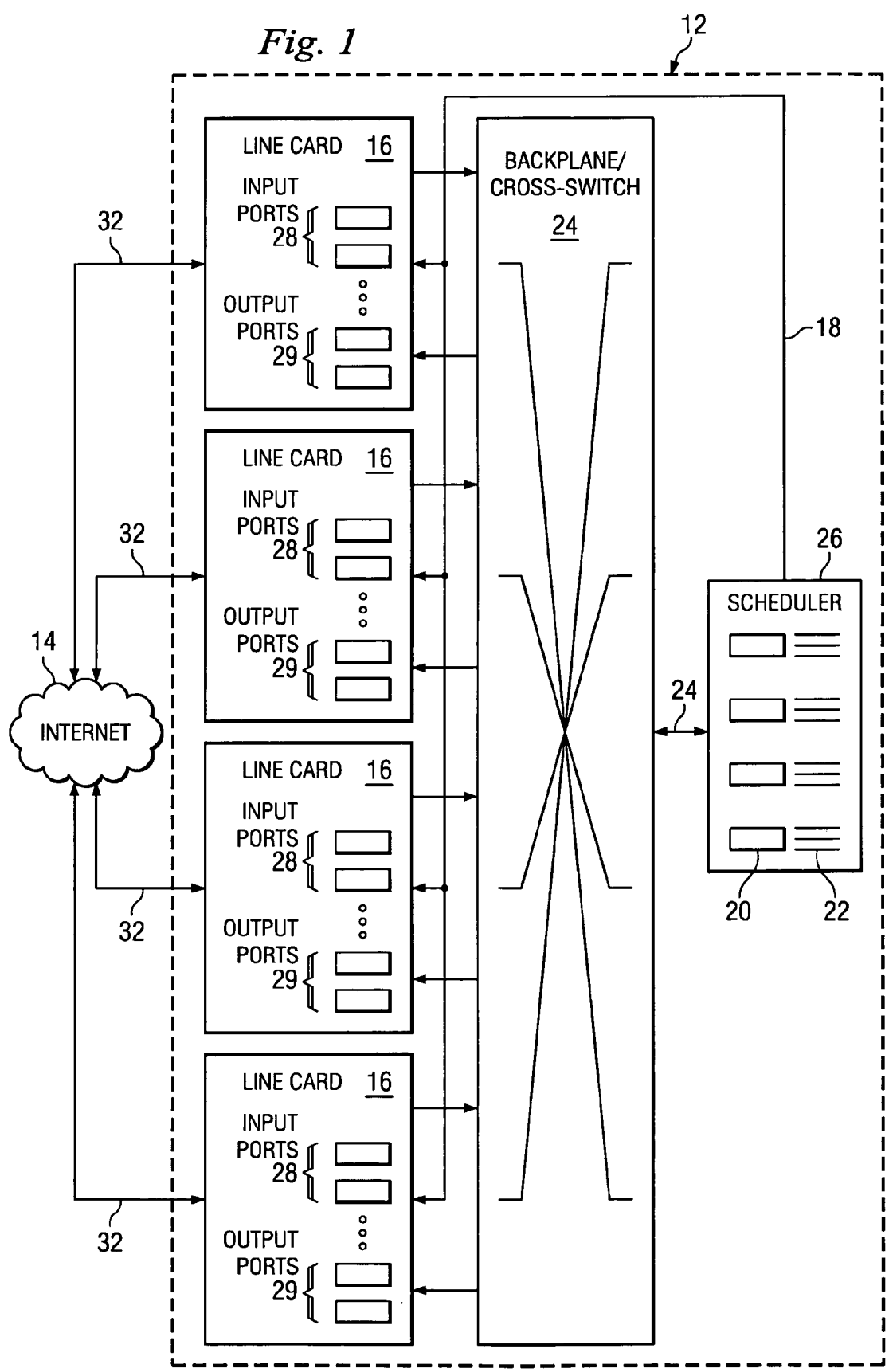
FIG. 1 is diagram of a network processing device.

FIG. 1 shows a network processing device 12 connected to an Internet network 14. Multiple connections 32 couple the network processing device 12 to the Internet 14. The different connections 32 are connected to different routing locations in Internet 14. The connections 32 are coupled to Line Interface Cards (LICs) 16. The LICs 16 each receive packets over the Internet 14 at input ports 28 and then request grants from scheduler 26 to send the received packet to output ports 29 for routing to different destination addresses.

When one of the input ports 28 receives one or more packets, that input port 28 makes a request over control bus 18 to scheduler 26 to send the packets over a back plane cross switch 24 to a particular one of the output ports 29. The scheduler 26 includes arbiters 20 for each output port 20. Separate output port arbitrations are conducted for each output port 29 by a different arbiter 20. The arbiters 20 each conduct an output port arbitration for all of the input ports 28 requesting the same output port 29. The scheduler 26 sends back a grant signal over control bus 18 to the particular input port 28 winning the output port arbitration.

Each input port has a group of associated Virtual Output Queues (VOQs) 22. One VOQ for each input port 28 is dedicated to a different output port 29. Multiple grants may be received for multiple VOQs for the same input port. A second input port arbitration is conducted when multiple VOQs 22 for the same input port 28 receive grants from different output ports 29. The arbiters 20 in scheduler 26 selects one of the granted VOQs for the input port 28 to win the input port arbitration. The winning VOQ 22 sends an accept signal back to the granting arbiter 20. Any grants that are not accepted go through another arbitration iteration. This arbitration scheme is repeated until convergence where no remaining unmatched output ports can be matched with any remaining unmatched input ports.

At the completion of a current time slot, the scheduler 26 reconfigures the cross switch 24 through control line 24 to connect the accepting input ports 28 to their granting output ports 29. A time slot is a predetermined amount of time allotted for sending packets from the input ports to the output ports. The input ports 28 then send packets identified in the VOQs to their connected output ports 29 during the next time slot.

Virtual Output Queues

Figure 2:
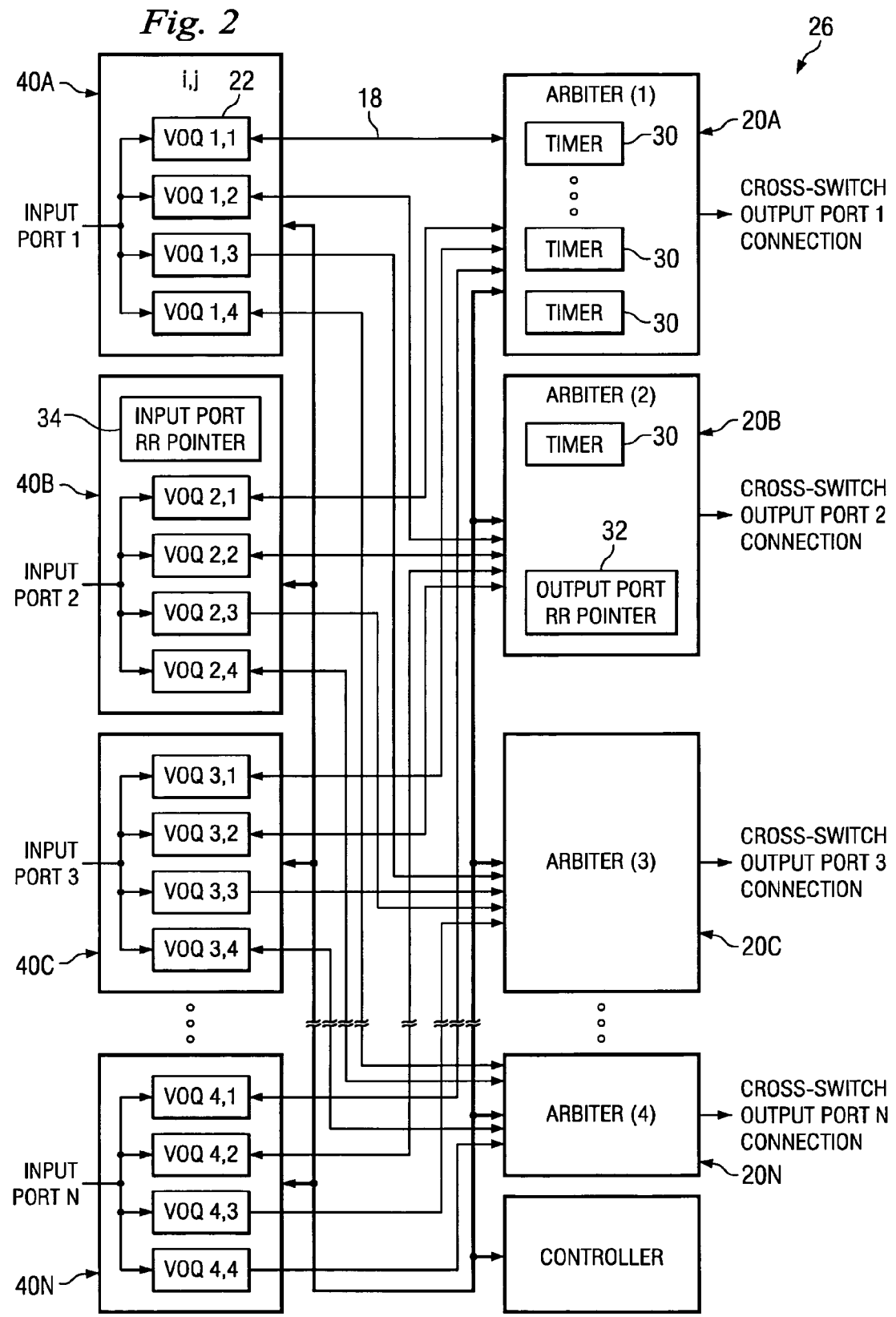
FIG. 2 is a detailed diagram of a scheduler shown in FIG. 1.

FIG. 2 is a more detailed diagram of the scheduler 26 shown in FIG. 1. The scheduler 26 performs a unicast arbitration and/or a multicast arbitration. Each input port 28 has an associated set of VOQ's 22. For example, VOQ(1,1), VOQ(1,2), VOQ(1,3), and VOQ(1,4) all contain addresses for packets received and stored for input port #1. Each VOQ for each input port is also dedicated to a different one of the output ports. For example, VOQ (1,1) is dedicated to output port #1, VOQ (1,2) is dedicated to output port #2, VOQ (1,3) is dedicated to output port #3 and VOQ (1,4) is dedicated to output port #4.

All the VOQ's for the same output port are arbitrated by the same arbiter 20. For example, arbiter (1) arbitrates among all input ports requesting connections to output port #1. The virtual output queues VOQ(1,1) for input port #1, VOQ (2,1) for input port #2, VOQ (3,1) for input port #3, and VOQ (4,1) for input port #4 are all arbitrated by arbiter(1). Similarly, VOQ (1,4), VOQ (2,4), VOQ (3,4) and VOQ (4,4) are all arbitrated by arbiter(4). Only four output ports are shown in the example in FIG. 2. However, it should be understood that any number of input ports and output ports can be used. The arbiters 20 can be implemented by programmable logic devices, discrete devices or in software using a software programmable device.

The VOQ's 22 prevent Head-of-Line blocking. The VOQs contain a linked list of memory addresses for packets having addresses directed to an associated one of the output ports. The VOQ's can independently request connections to their associated output ports and can independently be granted a connection request from their dedicated output ports. Thus, packets coming into one of the input ports and directed to a first output port will not block requests from packets coming into that same input port but directed to a different VOQ output port. This means that low priority packets will not block connections requests from other higher priority packets.

Multiparameter Arbitration Scheme

Different arbitration parameters are used by the arbiters 20 to determine which VOQs 42 are granted output ports. A Largest Weight First (LWF) arbitration is used to provide high stability for the network traffic. Each trunk of packet data accumulated in each input queue counts as one weight.

"One weight" represents the amount of data in bytes that an input port can forward to and output in one Epoch slot time. For the first weight of data, weight is represented by the range of one minimum packet (64-byte) for one Epoch data. This means that if there is one minimum packet stored in the input port, it has a weight of one. When the data accumulated is more than one epoch data, a counter is increment by one. Now the weight is equal to two. The epoch data depends on the slot time. The larger the slot time, the larger the amount of epoch data in bytes.

A Highest Priority First (HPF) arbitration is used for providing high throughput and low latency for packets with the highest priority. Priority values are user configurable and are contained in the packet headers. For example, a user may select a high priority for sending Voice Over IP packets.

An Oldest Request First (ORF) arbitration prevents starvation of packets with low priority and low weight. The ORF arbitration upgrades packets in any VOQ to the highest priority when those packets have not been serviced during a predetermined time period. The scheduler includes timers 30 for identifying VOQs that have requested, but not received, output port connections for some predetermined amount of time. After one of the timers 30 has timed out, the scheduler moves the associated VOQ to a highest priority. This eliminates packet starvation and guarantees every request from each VOQ will be serviced by an output port within a predetermined time period ensuring non-empty VOQs will not go unserved indefinitely.

A Round-Robin Matching (RRM) arbitration provides fairness. Each input port arbitration and each output port arbitration has a round-robin matching pointer. The RRM arbitration monitors the weight and priority of all VOQs during both output port arbitration and input port arbitration. If two or more VOQ's have the same priority and weight, the RRM pointer is used as a tie breaker. An output port RR pointer 32 (FIG. 2) is used in each arbiter 20 for output port RRM and an input port RR pointer 34 (FIG. 2) exists for each input port for RRM during input port arbitration.

The ORF, HPF, LWF and RRM arbitration parameters are used in different combinations and in different orders by the scheduler to provide a simple and intelligent mechanism to achieve a high speed, high bandwidth switch system.

Output Port Arbitration

FIG. 3 explains in more detail how the arbiters 20 in FIG. 2 each arbitrate requests from the different VOQs 22 for connection through the cross switch 24 for an upcoming time slot. In block 50 the arbiters for each output port receive requests from the unmatched VOQs dedicated to that same output port. If an unmatched output port receives any requests in block 52, the highest priority request is serviced first. If the same arbiter receives two or more of the same highest priority requests, the highest priority request with the largest weight will be serviced first in block 54.

Different combinations of the weight and priority can be used. For example, weight may be the first parameter used by the arbiter to select a VOQ. In this case, if two or more VOQs have the same largest weight, then the VOQ with the largest weight and highest priority is selected.

In another arbitration variation, the highest priorities over a certain threshold may be used first to base selection. If there are no VOQs over this priority threshold, then the output queue may select VOQ's that are over a particular weight threshold. If there are no VOQ's over the priority and weight thresholds, the output queues may use either the priority or weight values under the threshold, or a combination of both.

If two or more requests have the same highest priority and same highest weight, a round-robin arbitration is used in block 56 to determine which one of the requests is serviced first. The arbiter selects the request from the VOQ with the highest priority/weight that appears next in the output port round-robin pointer 32 (FIG. 2). In block 58, each output port notifies the winning VOQ by sending a grant signal. The round robin pointer is incremented to the next VOQ beyond the granted highest weight/priority in block 60 only if the grant is accepted.

FIG. 4 explains the arbitration conducted for each input port. Each input port detects any grants received back from one or more output ports in block 62. If multiple unmatched VOQ's for the same input port receive grants, the input port in block 64 accepts the grant for the VOQ with the highest priority.

If two or more VOQs receiving grants for the same input port have the same highest priority, then the VOQ with the highest priority and largest weight is selected in block 66. If two or more VOQs for the same input port have the same highest priority and the same weight, then the VOQ that appears next in the input port round-robin pointer 34 (FIG. 2) is selected in block 68. An accept signal is sent to the output port associated with the selected VOQ in block 70.

The pointer 34 in FIG. 2 starts from the highest weight/priority VOQ. In the next time slot, the pointer 32 moves to the next VOQ. The round-robin scheduler is incremented to one location beyond the accepted output port only if that input is matched in the first iteration of the arbitration.

In a manner similar to the output ports described in FIG. 3, arbitration of multiple granted VOQs can be alternatively based first on weight and then on priority or any other combination of both priority and weight.

Figure 5:
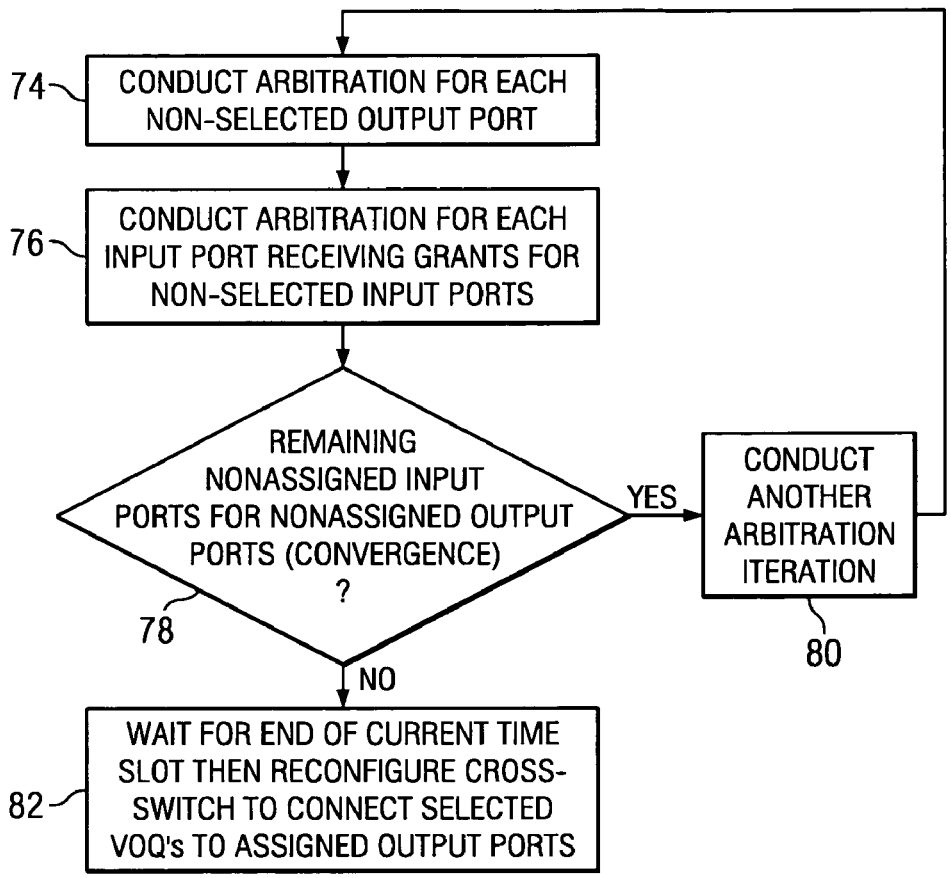
FIG. 5 is a flow diagram showing how output port arbitration and input port arbitration are conducted over multiple arbitration iterations.

FIG. 5 shows how the arbitration scheme is repeated until convergence. For any time slot, the highest VOQ request will be selected for connection first. But there is no guarantee the second highest priority (or alternatively second largest weight) VOQ will be granted a connection to its requested output port.

After the first arbitration iteration, several output ports may still not be matched with VOQs from one of the input ports. This occurs when multiple output ports issue grants to the same input port. Since the input ports only accepts one grant from one output port, the output ports whose grants are not accepted go back into a pool for a next arbitration iteration.

The arbitration will converge in at most N iterations, where N is the number of output ports. Each iteration will schedule zero, one or more connections. If zero connections are scheduled during an iteration, then the arbitration has converged and no more connections can be added with additional arbitration iterations. The slowest convergence will occur if exactly one connection is scheduled per iteration. At most N connections can be scheduled (one to every input and one to every output) which means the arbitration will converge in at most N iterations.

With one arbitration iteration, and under heavy load, VOQs with a common output all have the same throughput if all priority and weight are the same. For the matching algorithm that consists of more than one iteration, and under heavy load, VOQs with the same output port may each have a different throughput if all priority and weight are the same.

Block 74 conducts the output port arbitration for all nonselected output ports. In block 76 an arbitration is conducted for VOQs issued grants by the nonselected input ports. If there are still requests remaining for nonassinged output ports in decision block 78, block 80 returns for another arbitration iteration. If there are no remaining nonassigned input port connection requests for nonselected output ports, the scheduler stops any more arbitration iterations. In block 82, the scheduler waits for the current time slot to complete and then configures the cross switch to connect the selected VOQ's to their assigned output ports.

Starvation

Figure 6:
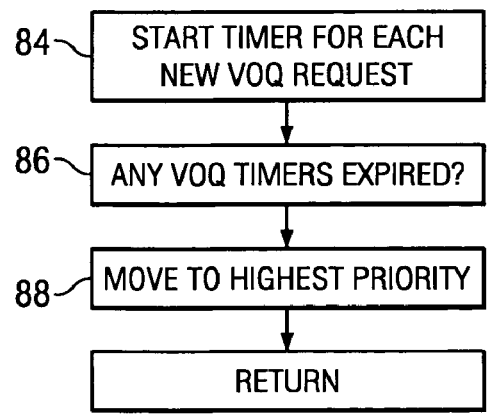
FIG. 6 is a flow diagram showing how input ports are prevented from starvation.

Referring to FIG. 6, the scheduler guarantees that no input will be starved for a connection and guarantees every VOQ will be serviced once during a predetermined number of time slots. In block 84, the scheduler starts the timers 30 in FIG. 2 whenever any VOQ makes a new connection request. If any of the timers expire in decision block 86, the scheduler automatically makes that VOQ highest priority for the arbitration conducted for the next time slot. This guarantees that the VOQs will be connected to output ports within a predetermined amount of time.

Unicast and Multicast Scheduling

Figure 7:
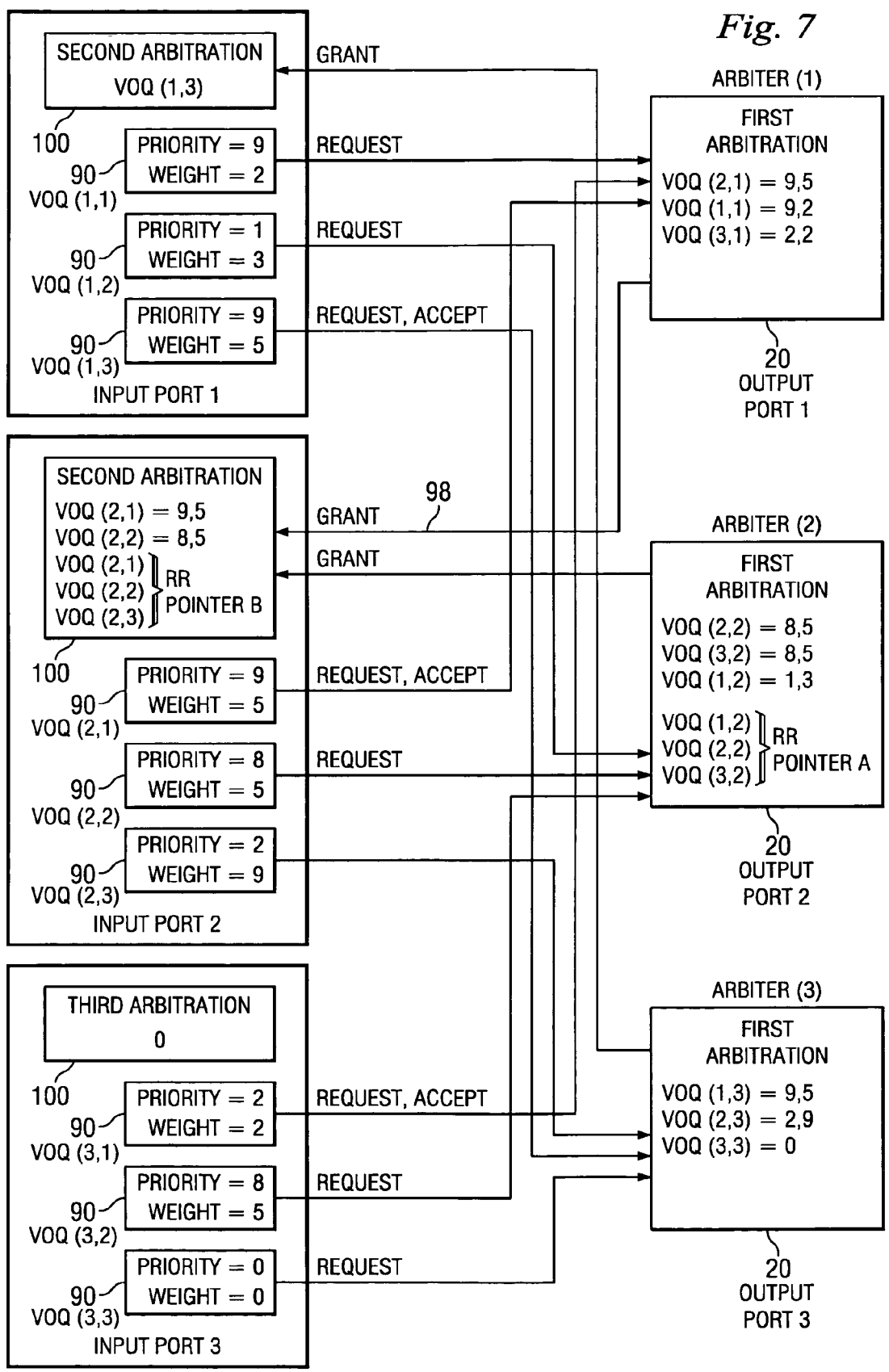
FIG. 7 is a block diagram of the scheduler showing one example of unicast arbitration.

The arbiters can arbitrate either unicast connection requests, multicast connection requests or both for the same time slots. FIG. 7 shows how the arbiters conduct arbitration for unicast packets.

Three input ports each have three associated Virtual Output Queues (VOQs). Input port #1 includes VOQ(1,1), VOQ(1,2) and VOQ(1,3). The VOQ(1,1) is dedicated to output port #1, VOQ(1,2) is dedicated to output port #2, and VOQ(1,3) is dedicated to output port #3. In a similar manner, input port #2 has VOQ(2,1) dedicated to output port #1, VOQ(2,2) dedicated to output port #2, and VOQ(2,3) dedicated to output port #3. Input port #3 has three VOQs dedicated in a similar manner to the three output ports. Again, the three input ports and three output ports are shown for illustration only. The network processing device may have any number of input ports, output ports and VOQs.

Each VOQ includes a register 90 that identifies the priority and weight for the packets requesting connection to the output ports. For example, the register 90 for VOQ(1,1) contains a priority of nine and a weight of two.

All VOQs(i,j) with a weight greater than zero send a request to their dedicated output port arbiter. A weight greater than zero indicates that there is at least one minimum packet (64-byte) assigned to that VOQ. Each arbiter(i) selects the highest priority and weight as the one to grant back to the input VOQ(i,j).

For example, arbiter(1) receives requests from VOQ(1,1), VOQ(2,1) and VOQ(3,1). The VOQ(1,1) and VOQ(2,1) both have the same highest priority value of nine. Therefore, arbiter(1) compares the weight of VOQ(1,1) with the weight of VOQ(2,1). Because, VOQ(2,1) has a weight of five and VOQ(1,1) only has a weight of two, VOQ(2,1) wins the arbitration. Thus, VOQ(2,1) is issued a grant 98 from arbiter(1). The arbitration for output port #2 includes requests from VOQ(1,2), VOQ(2,2), and VOQ(3,2). Both VOQ(2,2) and VOQ(3,2) have the same highest priority of eight. The arbiter(2) then compares the weight of VOQ(2,2) and VOQ(3,2). Because VOQ(2,2) and VOQ(3,2) both have the same weight of five, arbiter(2) goes to a round robin arbitration. The RR pointer in arbiter(2) currently points at VOQ(2,2). Therefore, VOQ(2,2) in input port #2 is issued the grant for output port #2.

Arbiter(3) performs an arbitration between VOQ(1,3) and VOQ(2,3). The VOQ(3,3) does not have any packets (weight=0) and therefore does not participate in the arbitration for output port #3. Arbiter(3) sends the grant to input port #1 because VOQ(1,3) has the highest priority of nine.

The same arbiter(i) is used to perform the priority and weight arbitration for input port(i) and accepts the highest priority and weight as the one to accept the connection with the granted output port. For example, input port #1 only received one grant by arbiter(3) for VOQ(1,3). Therefore, VOQ(1,3) will accept the connection to output port #3.

For input port #2, both VOQ(2,1) and VOQ(2,2) receive grants from arbiter(1) and arbiter(2), respectively. Because VOQ(2,1) has a higher priority than VOQ(2,2), VOQ(2,1) accepts the grant from arbiter(1) for output port #1. No second arbitration is conducted for input port #3 since none of the VOQs for input port #3 received grants. If any VOQ(i,j) accepts a grant from one of the output ports(j), that VOQ(i,j) does not participate in any further arbitration iterations for the next time slot. Otherwise, the unmatched VOQs compete in another arbitration iteration. The arbitration iterations stop when no unmatched input ports can be matched with unmatched output ports or the iteration counter is equal to the programmed maximum iteration number.

Input port #1 accepted a grant to output port #3 and input port #2 accepted a grant to output port #1 in the first arbitration iteration. Therefore, another arbitration iteration can be conducted with the remaining unassigned VOQs for input port #3 and output port #2. In the second iteration, VOQ(3,2) is assigned to output port #2. After the second iteration, all input ports are matched to output ports (convergence). Thus, the arbitration is completed for the next time slot.

After completion of the current time slot, the scheduler reconfigures the cross switch so that VOQ(2,1) is connected to output port #1, VOQ(3,2) is connected to output port #2 and VOQ(1,3) is connected to output port #3.

Figure 8:
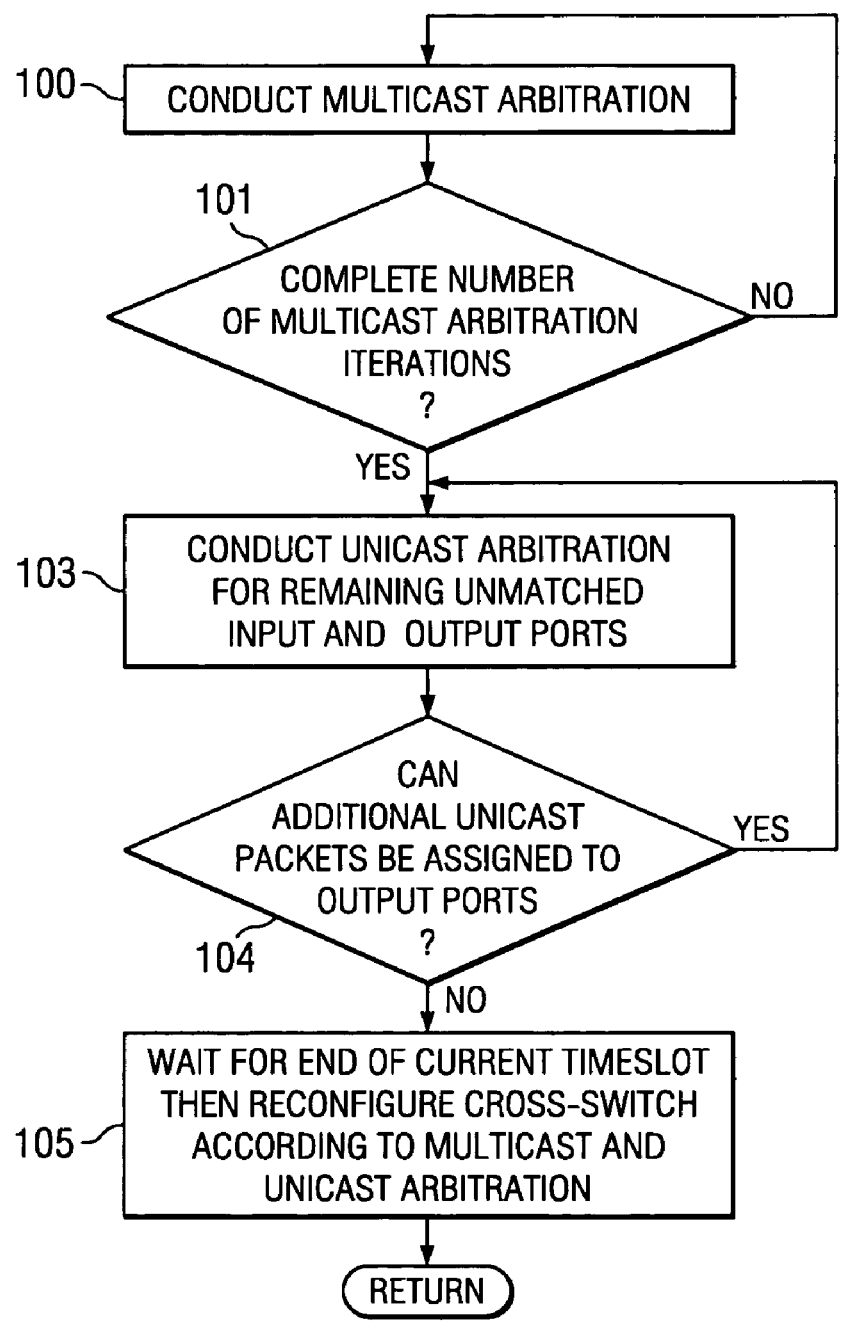
FIG. 8 is a flow diagram showing how dual multicast and unicast arbitration is conducted by the scheduler.

FIG. 8 shows how both multicast arbitration and unicast arbitration are conducted for assigning connections during the same time slot. In block 100 the scheduler conducts a multicast arbitration for any multicast vectors received at the input ports. Multicast vectors identify the priority and weight of a multicast packet and identifies all of the output ports where the multicast needs to be sent. A multicast packet is a packet sent to more than one destination at the same time. For example, when the same email is sent to multiple recipients, that email is sent using multicast packets.

The scheduler in decision block 101 determines when to switch from multicast to unicast arbitration. For the multicast arbitration slot time, the scheduler will not switch to unicast arbitration until all MCGs have been through a predetermined number of iterations. For example, if there are 8 MCGs, that requires at least 8 iterations before switching to unicast arbitration. In multicast iteration, it may not always be possible to find a set of output ports to match the MCGV of the inputs, except for the first iteration. That means, the second and later iterations for the multicast might not find a match for input-output.

Unicast arbitration is conducted for in block 103 is the same as described above in FIG. 7. After the first unicast arbitration iteration in block 103, the scheduler determines in decision block 104 if there are any additional unmatched unicast packets that can be assigned to unmatched output ports. If there are, an additional unicast arbitration iteration is conducted. If there are no more unmatched unicast packets that can be assigned to unmatched output ports, the scheduler in block 105 waits for the end of the current time slot. The cross switch is then reconfigured according to the multicast and unicast arbitrations. The input ports then send their packets through the configured cross switch to the output ports during the next time slot.

Figure 9:
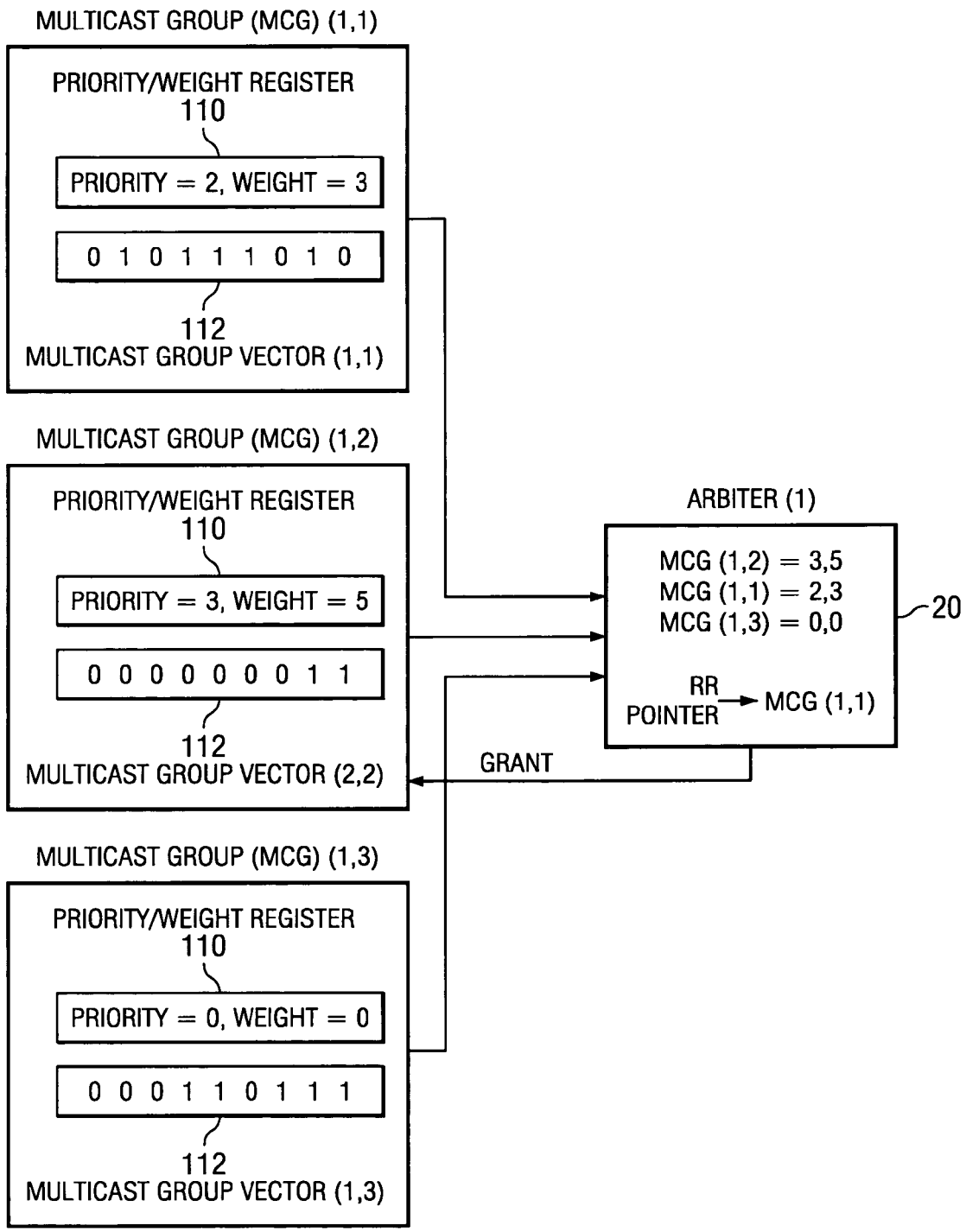
FIG. 9 is a block diagram showing one example of input port multicast arbitration.

FIG. 9 shows an example of how a first phase of multicast arbitration is conducted. Instead of first arbitrating for the output ports, the multicast arbitration first arbitrates for the input ports. Each input port has multiple multicast groups, each multicast group has one priority/weight register 110 and a multicast group vector (MCGV) 112. Each bit in the MCGV 112 is dedicated to one of the output ports. A binary "1" value in the MCGV 112 indicates that the multicast packet is directed to an associated output port.

Input port scheduling identifies the highest priority/weight multicast group for each input port. In the example shown in FIG. 9, three multicast groups, MCG(1,1), MCG(1,2), and MCG(1,3) for input port #1 are arbitrated by arbiter(1).

The MCG(1,2) has the highest priority/weight and wins the input port arbitration for input port #1. However, if there were more than one multicast group with the same highest priority/weight, then the round-robin scheme would be used to select the multicast group. The RR pointer would then be moved to the next group in the list.

At the end of this first input port iteration, every input port has selected one and only one MCG to complete for the output ports. For the case of input port #1, arbiter(1) has selected MCG(1,2). Each input port has one VOQ(i,j) dedicated to each output port. Each MCGV 112 has one bit allocated for each output port and one priority/weight value in register 110. The winning priority/weight value from the input port multicast arbitration is loaded into each VOQ(i,j) associated with MCGV(i,j)>0. Otherwise, VOQ(i,j) is loaded with a "0" value (no request). The Priority and Weight for the winning MCG for a particular input port gets loaded into each VOQ for that input port that does not have zero MCGV.

Each MCG has it's own Priority and weight, that is the same as unicast. In the input port, each unicast and multicast is handled the same way except multicast has it's own MCG vector for multiple outputs. Every received multicast packet will be stored in one of the MCGs. Each MCG has it's own priority as well, therefore, each MCG has different weight and priority.

During multicast arbitration, the MCGs are first arbitrated within the same input port according to their own priority and weights. Second, the priority and weight of the winner is loaded to all the VOQs (share the same VOQs with unicast) with MCGV>0. Otherwise, the VOQs are loaded with 0.

Each request to the same output port arbiter(1) represents one input from one of the multicast groups MCG(i,j). The highest priority/weight multicast group is issued a grant. Again, if there is more than one MCG with the same highest priority/weight, a Round-Robin arbitration is conducted. One global RR pointer is used for all output ports, and is incremented by one for each multicast time slot.

All the grants from the output port arbitrations are returned back to the winning MCG(i,j). Each MCG(i,j) compares the granted MCG(i,j) with the MCGV(i,j), if they match bit-by-bit, this input MCG(i,j) accepts the grant, and removes itself and the granted output ports from the next multicast iteration. The output port arbitration is repeated once for each MCG.

When the multicast arbitration is completed, the unicast arbitration takes over. The first thing the scheduler does is load all the unicast priority and weight values to all VOQs from the unicast VOQ buffers before starting a unicast arbitration iteration.

Figure 10:
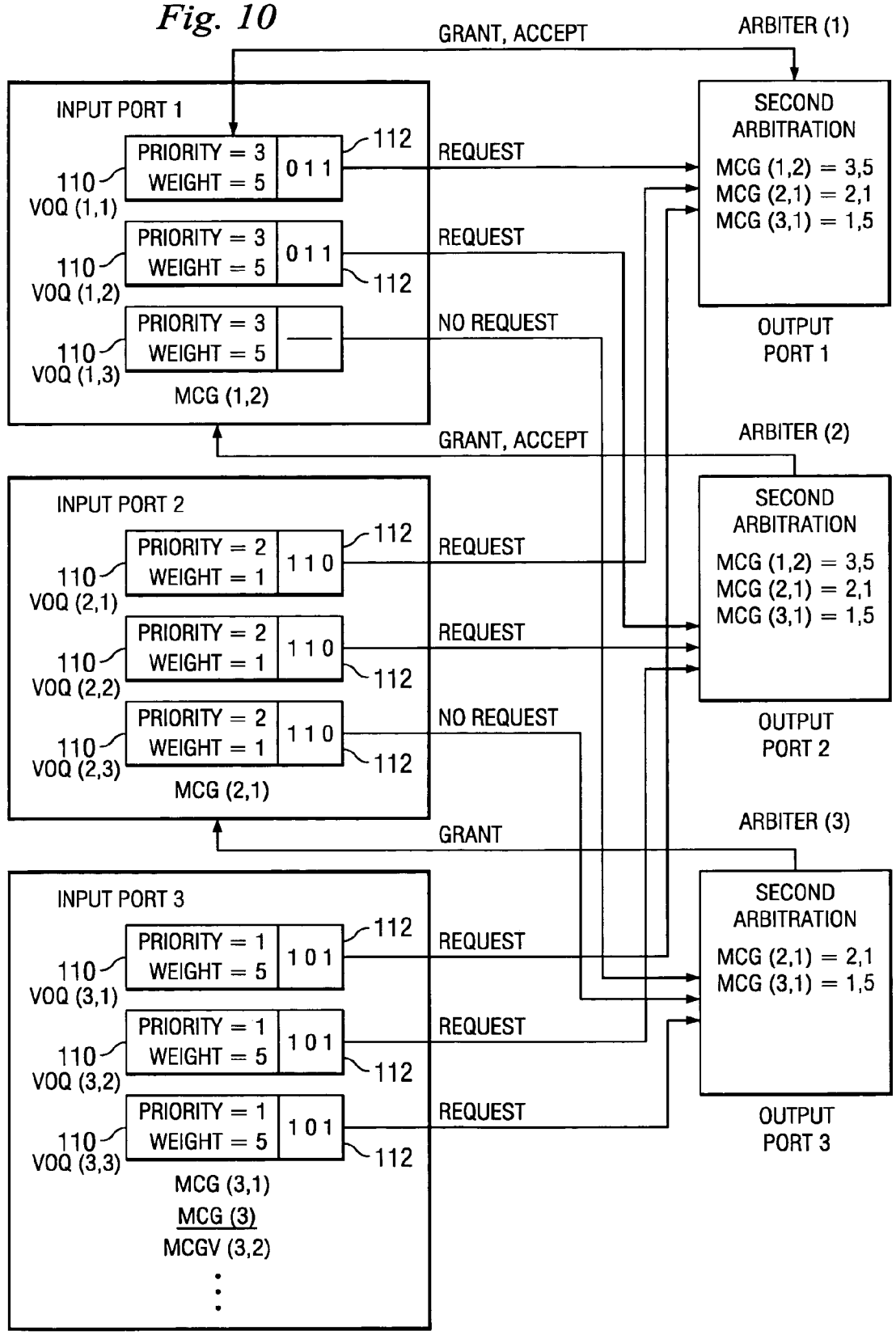
FIG. 10 is a block diagram showing one example of output port multicast arbitration.

FIG. 10 shows one example of the second part of the multicast arbitration. As described in FIG. 9, the winning MCG for input port #1 has a multicast group vector of "011", a priority of three, and a weight of five. Only VOQ (1,1) and VOQ (1,2) send the highest multicast group priority/weight to arbiter(1) and arbiter(2), respectively. Input ports #2 and #3 similarly send the winning multicast group vectors from their respective input port arbitrations.

Each arbiter(i) is associated with one of the output ports and selects the highest priority and weight as the one to grant back to the input port. For example, arbiter(1) issues a grant to MCG(1,2), arbiter(2) issues a grant to MCG(1,2) and arbiter(3) issues a grant to MCG(2,1).

For input port(i), the grant is compared with the MCGV 112. In this case, MCGV 112 for MCG(1,2) has the bit pattern "011" which matches the grants received from arbiter (1) and arbiter(2). Accordingly, MCG(1,2) accepts the two grants and removes itself and the granted output ports from next iteration of scheduling arbitration. Only one grant is received by MCG(2,1) which does not match the MCGV "110". Therefore, input port #2 does not accept the grants from arbiter(3).

The output port arbitration is repeated once for each MCG. If there is any output port still unselected, one or more unicast arbitrations will be conducted in the same manner described above in FIG. 7. Unicast arbitration is conducted until no more connections can be matched.

The scheduler lists which input ports have accepted grants from output ports. After the completion of the current time slot, the schedule than reconfigures the cross switch (FIG. 1) to connect the input ports to the granted output ports. The input ports during the next time slot send the packets identified in VOQs to the connected output ports. The time slots can be from several microseconds to 100 microseconds. Therefore, there is sufficient time during the current time slot to conduct both the multicast and unicast arbitration for the next time slot.

The time slots can be programmed to be longer or shorter depending on current latency performance of the network processing device. Other network protocols, such as Asynchronous Transfer Mode (ATM) only send small packets at a short amount of time and therefore do not have sufficient time to conduct the multiple level multicast and unicast arbitration described above.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A packet scheduler, comprising:
    inputs configured to receive requests for connecting multiple input ports to multiple output ports;
    outputs for configuring multiple concurrent connections according to a matching between the multiple input ports and the multiple output ports; and
    an arbitration circuit configured to conduct a first arbitration phase for a next time slot where multiple independent arbitrations are conducted concurrently for each of the multiple output ports, the arbitration circuit selecting the input ports for each of the output ports for the next time slot according to both a priority and weight of packets at the input ports used for the multiple independent arbitrations, wherein the input port weight of packets for each output port arbitration is based on the amount of data accumulated at that input port for forwarding to the output port related to that arbitration.

2. A scheduler according to claim 1 wherein the input ports that win multiple ones of the multiple arbitrations accept one of the arbitration wins and reject the other arbitration wins, the arbitration circuit then conducting another arbitration phase for the next time slot with independent arbitrations for each of the output ports that did not receive arbitration win acceptance from input ports during the first arbitration phase.

3. A scheduler according to claim 2 including timers that are activated anytime one of the input ports requests a connection to one of the output ports, the arbitration circuit increasing the priority for any input ports having unserviced connection requests extending beyond a timer period.

4. A scheduler according to claim 1 wherein the arbitration circuit conducts output port arbitrations for each one of the output ports and conducts input port arbitrations for each one of the input ports winning multiple output port arbitrations.

5. A scheduler according to claim 4 wherein the output port arbitrations and the input port arbitrations are conducted for both multicast packets and unicast packets for the next time slot.

6. A scheduler according to claim 1 wherein each one of the input ports has associated virtual output queues each dedicated to a different one of the output ports.

7. A scheduler according to claim 6 wherein the arbitration circuit conducts output port arbitrations for all of the virtual output queues dedicated to the same output ports and conducts input port arbitrations between the virtual output queues for the same input port issued grants during the output port arbitrations.

8. A scheduler according to claim 7 wherein the output port arbitrations and the input port arbitrations are conducted according to both the priority and number of bytes of the packets associated with the virtual output queues.

9. A scheduler according to claim 8 including output port pointers for conducting round robin arbitrations during the output port arbitrations and input port pointers for conducting round robin arbitrations during the input port arbitrations.

10. A scheduler according to claim 9 including a cross switch that is configured by the arbitration circuit to connect the input ports to the output ports during individual time slots according to the output port arbitrations and the input port arbitrations.

11. A scheduler according to claim 1 wherein the arbitration circuit conducts a multicast arbitration that establishes connections for multicast packets during a next time slot and then conducts a unicast arbitration that establishes connections for unicast packets during the next time slot for any remaining unassigned output ports.

12. A scheduler according to claim 11 wherein the multicast arbitration and the unicast arbitration are conducted for both output port arbitrations and also for input port arbitrations.

13. A packet scheduler, comprising:
    inputs configured to receive requests for connecting input ports to output ports;
    outputs for configuring connections between the input ports and the output ports; and
    an arbitration circuit configured to arbitrate between the input ports for connections to the output ports, the arbitration circuit selecting the input ports for a next time slot according to both a priority and weight of packets at the input ports,
    wherein the arbitration circuit conducts a multicast arbitration that establishes connections for multicast packets during the next time slot and then conducts a unicast arbitration that establishes connections for unicast packets during the next time slot for any remaining unassigned output ports, the multicast arbitration and the unicast arbitration conducted for both output port arbitrations and also for input port arbitrations and the arbitration circuit is programmable to vary a percentage of output ports assignable during the multicast arbitration.

14. A method for scheduling multiple concurrent connections between multiple input ports and multiple output ports, comprising:
    receiving requests from multiple input port buffers for connections to the multiple output ports during a next time slot;
    identifying arbitration parameters for the requests;
    conducting multiple independent output port arbitrations for each one of the multiple output ports according to the arbitration parameters;
    issuing grants to the input port buffers winning the output port arbitrations for each of the multiple output ports;

conducting input port arbitrations for input ports receiving grants from multiple output port arbitrations;
accepting one of the multiple grants for each of the input port arbitrations; and
connecting the multiple output ports to the input port buffers accepting the grants;
wherein the arbitration parameters include a weight that varies according to a number of packet bytes in the input port buffers and a priority of the packets in the input port buffers.

15. A method according to claim 14 including:
selecting one of the weight and the priority to identify a first highest arbitration status;
using the other nonselected weight and priority to identify a second highest arbitration status for two or more input port buffers having the same first highest arbitration status; and
issuing grants to the input port buffers according to the first highest arbitration status when packet for only one input port buffer has the first highest arbitration status and issuing grants to the input port buffers according to the second highest arbitration status when two or more input port buffers have the first highest arbitration status.

16. A method according to claim 15 including using a round robin arbitration when two or more input port buffers have the same first highest arbitration status and the same second highest arbitration status.

17. A method according to claim 14 including dedicating one input port buffer in each input port to one of the output ports and using the input port buffers as virtual output buffers for temporarily storing packets assigned to the output ports to which the input port buffers are dedicated.

18. A method according to claim 14 including conducting a first round robin arbitration when multiple packets have a same highest priority and a same weight during the output port arbitrations and conducting a second round robin arbitration during the input port arbitrations when multiple input port buffers for the same input ports have been issued grants during the output port arbitration and have the same highest priority and the same weight.

19. A method for scheduling connections between multiple input ports and multiple output ports, comprising:
receiving requests from multiple input port buffers for connections to the multiple output ports during a next time slot;
identifying arbitration parameters for the requests;
conducting multiple independent output port arbitrations for each one of the multiple output ports according to the arbitration parameters;
issuing grants to the input port buffers winning the output port arbitrations for each of the multiple output ports;
conducting input port arbitrations for input ports receiving grants from multiple output port arbitrations;
accepting one of the multiple grants for each of the input port arbitrations;
conducting second independent arbitrations between each of the output ports that did not receive a grant acceptance from one of the input ports and any of the input port buffers that did not previously receive grants; and
connecting the multiple output ports to the input port buffers accepting the grants.

20. A method for scheduling connections between multiple input ports and multiple output ports, comprising:
receiving requests from multiple input port buffers for connections to the multiple output ports during a next time slot;
identifying arbitration parameters for the requests;
conducting a multicast arbitration for multicast packets in the input port buffers;
conducting multiple independent output port arbitrations for each one of the multiple output ports according to the arbitration parameters;
granting one of the input port buffers winning the multicast arbitration all output ports identified in an associated multicast group vector;
issuing grants to the input port buffers winning the output port arbitrations for each of the multiple output ports;
conducting input port arbitrations for input ports receiving grants from multiple output port arbitrations;
accepting one of the multiple grants for each of the input port arbitrations; and
connecting the multiple output ports to the input port buffers accepting the grants.

21. A method according to claim 20 including conducting a unicast arbitration after the multicast arbitration.

22. A method for scheduling connections between input ports and output ports, comprising:
receiving requests from input port buffers for connections to the output ports during a next time slot;
identifying arbitration parameters for the requests;
conducting output port arbitrations for each one of the output ports according to the arbitration parameters;
issuing grants to the input port buffers winning the output port arbitrations;
conducting input port arbitrations for input port buffers receiving grants from the output port arbitrations;
accepting one of the grants to one of the input port buffers at each input port buffer winning at least one output port arbitration;
connecting the input port buffers accepting the grants to the requested output ports;
conducting a multicast arbitration for multicast packets in the input port buffers;
granting one of the input port buffers winning the multicast arbitration all output ports identified in an associated multicast group vector;
identifying multicast group vectors for the multicast packets;
conducting multicast input port arbitrations for identifying a highest one of the multicast group vectors for each one of the input port buffers;
conducting multicast output port arbitrations using the highest multicast group vectors for the input port buffers; and
establishing connections for the multicast group vector winning the multicast output port arbitrations.

23. A method according to claim 22 including:
comparing grants issued from the output port arbitrations with the multicast group vectors; and
accepting the grants matching the multicast group vectors.

24. A network processing device, comprising:
multiple input ports for receiving incoming packets;
multiple output ports for outputting packets;
a cross switch coupled to the input ports and the output ports;
a scheduler that configures the cross switch for connecting multiple selected ones of the input ports to multiple selected ones of the output ports at the same time; and
multiple virtual output buffers associated with each one of the input ports, each one of the virtual output buffers dedicated to a different one of the output ports, the scheduler conducting multiple independent output port arbitrations for each one of the multiple output ports and the associated dedicated virtual output buffers and configuring the cross-switch according to the multiple independent arbitrations, wherein the scheduler conducts a multicast arbitration before each time slot to select virtual output buffers to connect to multiple output ports, the scheduler then conducting a unicast arbitration for connecting any unselected virtual output buffers to unselected output ports.

25. A network processing device according to claim 24 wherein the scheduler conducts the multicast arbitration and the unicast arbitration both for the virtual output buffers associated with the same input ports and for the virtual output buffers assigned to the same output ports.

26. A network processing device according to claim 25 wherein the multicast arbitration and the unicast arbitration:
   issue grants according to priority of the packets in the virtual output buffers;
   issue grants according to a weight based on a number of bytes in the packets for a virtual output buffer when packets for two or more virtual output buffers have a same highest priority; and
   issue grants according to a round robin order when packets for two or more virtual output buffers have the same highest priority and a same weight.

27. A network processing device according to claim 26 wherein the multicast arbitration and the unicast arbitration determine connections between the input ports and the output ports before each time slot.

28. A network processing device, comprising:
   multiple input ports for receiving incoming packets;
   multiple output ports for outputting packets;
   a cross switch coupled to the input ports and the output ports;
   a scheduler that configures the cross switch for connecting multiple selected ones of the input ports to multiple selected ones of the output ports at the same time; and
   multiple virtual output buffers associated with each one of the input ports, each one of the virtual output buffers dedicated to a different one of the output ports, the scheduler conducting multiple independent output port arbitrations for each one of the multiple output ports and the associated dedicated virtual output buffers and configuring the cross-switch according to the multiple independent arbitrations, the scheduler conducting a second separate set of independent arbitrations between any of the output ports that did not receive connection acceptance from an input port arbitration winner and the virtual output buffers associated with the input ports that did not win one of the previous independent output port arbitrations.

29. A packet scheduler comprising:

input circuitry to receive queue status for a plurality of input ports, the queue status for each input port identifying, for a plurality of output ports, the output ports for which that input port has data queued for transmission; and an arbitration circuit to conduct a multi-phase arbitration to produce a matching between the input ports and the output ports, each arbitration phase comprising conducting an independent output port arbitration for each unmatched output port to select an unmatched input port having data queued for that output port, and conducting an independent input port arbitration for each input port selected by at least one output port arbitration to select an input port-output port matching, the arbitration circuit terminating the multi-phase arbitration when no further input port-output port matches are possible.

* * * * *